United States Patent
Darling et al.

(10) Patent No.: US 10,115,983 B2
(45) Date of Patent: Oct. 30, 2018

(54) FLOW BATTERY WITH MANIFOLD PASSAGE THAT VARIES IN CROSS-SECTION

(71) Applicant: United Technologies Corporation, Hartford, CT (US)

(72) Inventors: Robert Mason Darling, South Windsor, CT (US); Michael L. Perry, Glastonbury, CT (US); Jinlei Ding, Shanghai (CN); Craig R. Walker, South Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 178 days.

(21) Appl. No.: 14/897,339

(22) PCT Filed: Jun. 13, 2013

(86) PCT No.: PCT/US2013/045532
§ 371 (c)(1),
(2) Date: Dec. 10, 2015

(87) PCT Pub. No.: WO2014/200482
PCT Pub. Date: Dec. 18, 2014

(65) Prior Publication Data
US 2016/0133964 A1  May 12, 2016

(51) Int. Cl.
*H01M 8/04* (2016.01)
*H01M 8/20* (2006.01)
(Continued)

(52) U.S. Cl.
CPC ... *H01M 8/04186* (2013.01); *H01M 8/04201* (2013.01); *H01M 8/188* (2013.01); *H01M 8/20* (2013.01); *Y02E 60/528* (2013.01)

(58) Field of Classification Search
CPC combination set(s) only.
See application file for complete search history.

(56) References Cited

U.S. PATENT DOCUMENTS 5,188,911 A * 2/1993 Downing ............... H01M 2/40
                                                  429/119
5,318,865 A    6/1994 Kaneko et al.
(Continued)

FOREIGN PATENT DOCUMENTS

GB    1375437    11/1974
GB    2372143    8/2002
(Continued)

OTHER PUBLICATIONS

International Preliminary Report on Patentability for International Application PCT/US2013/045532 dated Dec. 23, 2015.
(Continued)

*Primary Examiner* — Matthew J Merkling
(74) *Attorney, Agent, or Firm* — Carlson, Gaskey & Olds, P.C.

(57) ABSTRACT

A flow battery includes a cell stack that has electrochemically active cells and manifolds that define common manifold passages in fluid communication with the electrochemically active cells. A supply/storage system is external of the cell stack and includes at least one vessel fluidly connected with respective ones of the common manifold passages. Fluid electrolytes are in the supply/storage system. At least one of the fluid electrolytes is an ionic-conductive fluid. The manifolds extend in a length direction through the cell stack. The common manifold passages include a common manifold passage P that varies in cross-section along the length direction.

21 Claims, 4 Drawing Sheets

(51) Int. Cl.
H01M 8/18 (2006.01)
H01M 8/04186 (2016.01)
H01M 8/04082 (2016.01)

(56) References Cited

U.S. PATENT DOCUMENTS

| | | | |
|---|---|---|---|
| 5,648,184 | A | 7/1997 | Inoue et al. |
| 6,416,899 | B1 | 7/2002 | Wariishi et al. |
| 9,166,243 | B2 | 10/2015 | Perry |
| 2004/0202915 | A1 | 10/2004 | Nakaishi et al. |
| 2005/0244703 | A1 | 11/2005 | Osenar |
| 2008/0274393 | A1 | 11/2008 | Markoski et al. |
| 2008/0292938 | A1 | 11/2008 | Perry et al. |
| 2009/0136789 | A1 | 5/2009 | Pien et al. |
| 2010/0323264 | A1 | 12/2010 | Chiang |
| 2012/0247573 | A1 | 10/2012 | Lomax, Jr. et al. |
| 2012/0328910 | A1 | 12/2012 | Ia O' et al. |
| 2013/0029196 | A1 | 1/2013 | Perry et al. |

FOREIGN PATENT DOCUMENTS

| | | |
|---|---|---|
| JP | S54-19228 | 7/1979 |
| JP | 6047373 | 3/1985 |
| JP | 63213261 | 9/1988 |
| JP | H02-148659 | 6/1990 |
| JP | 2006-156029 | 6/2006 |

OTHER PUBLICATIONS

File History for U.S. Appl. No. 13/513,651 now U.S. Pat. No. 9,166,243 issued Oct. 20, 2015.
Certified Translation. Japanese Publication of Examined Patent Application No. S52-102887 published Jul. 13, 1979.
Certified Translation. Japanese Unexamined Patent Application No. H2-148659 published Jun. 7, 1990.
Certified Translation. Japanese Unexamined Patent Application No. 2006-156029 published Jun. 15, 1990.
Linden, D. and Reddy, T.B. Eds. (2002). Handbook of batteries. New York, NY: McGraw-Hill. pp. 37.12, 18-23, 42.3-13, 43.11-3, Appendix A.
Laramini, J. and Dicks, A. (2003). Fuel cell systems explained. Chichester, England: John Wiley & Sons Inc. pp. xv, xvi, 18-9, 88-89, 94-96.
Haar, D. (2016). Dan Haar: United Technologies battery could upend the power business. Hartford Courant. Retrieved Feb. 22, 2017 from: http://www.courant.com/business/dan-haar/hc-haar-united-technologies-battery-for-electric-grid-20160523-column.html.
Aricò, A.S., Creti, P., Baglio, V., Modica, E., and Antonucci, V. (2000). Influence of flow field design on the performance of a direct methanol fuel cell. Journal of Power Sources vol. 91. 2000. pp. 202-209.
Li, X. and Sabir, I. (2004). Review of bipolar plates in PEM fuel cells: Flow-field designs. International Journal of Hydrogen Energy vol. 30. 2005. pp. 359-371.

Negishi, A. (2003). Redox flow battery. (Certified Translation). Fuel Cells vol. 2(4). 2003. pp. 69-74.
Yi, J.S., and Nguyen T.V. (1996). Abstract: Hydrodynamics of reactant gas in the electrode of PEM fuel cells with inter-digitated flow fields. The Electrochemical Society, Inc. Meeting Abstracts. Fall Meeting, San Antonio, TX. Oct. 6-11, 1996. p. 974-6.
Kazim, A., Liu, H.T., and Forges, P. (1999). Modelling of performance of PEM fuel cells with conventional and interdigitated flow fields. Journal of Applied Electrochemistry vol. 29(12). 1999. pp. 1409-1416.
Wang, L. and Liu, H. (2004). Performance studies of PEM fuel cells with interdigitated flow fields. Journal of Power Sources vol. 13(2). 2004. pp. 185-196.
Guo, S.M. (2005). The simulation of a PEMFC with an interdigitated flow field design. Computational Science 5th International Conference. May 2005. pp. 104-111.
He, W., Yi, J.S., Nguyen, T.V. (2000). Two-phase flow model of the cathode of PEM fuel ceels using interdigitated flow fields. AIChE Journal vol. 46(10). Oct. 2000. pp. 2053-2064.
Nozaki, K., Hamamoto, O., Kaneko, H., and Ozawa, T. (1975). (Certified Translation). Prospect of power storage using redox flow type secondary battery. Electrochemical/Electro-thermal Study Group Material. The Institute of Electrical Engineers of Japan. Nov. 28, 1975. pp. 1-16.
Declaration of Dr. Toru Kato, Ph.D. In re U.S. Pat. No. 9,166,243. Executed Feb. 23, 2017. pp. 1-89.
Prior Art Claim Chart for U.S. Pat. No. 9,166,243.
Ponce de León, C., Frías-Ferrer, A., González-García, Szánto, D.A., and Walsh, F.C. (2006). Redox flow cells for energy conversion. Journal of Power Sources vol. 160. 2006. pp. 716-732.
Negishi, A. (2003). Redox flow battery. Fuel Cells vol. 2(4). 2003. pp. 69-74.
Nozaki, K., Hamamoto, O., Kaneko, H., and Ozawa, T. (1975). Prospect of power storage using redox flow type secondary battery. Electrochemical/Electro-thermal Study Group Material. The Institute of Electrical Engineers of Japan. Nov. 28, 1975. pp. 1-16.
Shigematsu, T. (2011). Redox flow battery for energy storage. SEI Technical Review No. 73. Oct. 2011. pp. 4-13.
Tokuda, N., Kanno, T., Hara, T., Shigematsu, T., Tsutsui, Y., Ikeuchi, A., Itou, T., et al. (2000). Development of a redox flow battery system. SEI Technical Review No. 73. Jun. 2000. pp. 88-94.
Hagedorn, N.H. (1984). NASA redox storage system development project. Final Report. DOE/NASA/12726-24. Oct. 1984. pp. 1-43.
Sumitomo Electric. Redox Flow Battery. Technical Document. Retrieved May 8, 2017 from: http://global-sei.com/products/redox/pdf/redox-flow-battery.pdf.
Petition for Inter Partes Review of U.S. Pat. No. 9,166,243. Sumitomo Electric Industries, Ltd., Petitioner, v. United Technologies Corporation, Patent Owner. Filed Feb. 23, 2017.
International Search Report for PCT Application No. PCT/US2013/045532 completed Nov. 5, 2013.
Skyllas-Kazacos, M., McCann, J., Li, Y., Bao, J., and Tang, A. (2016). The mechanism and modelling of shunt current in the vanadium redox flaw battery. ChemistrySelect 2016, 1, 2249-2256.
Supplementary European Search Report for European Patent Application No. 13886800 completed Oct. 27, 2016.

* cited by examiner

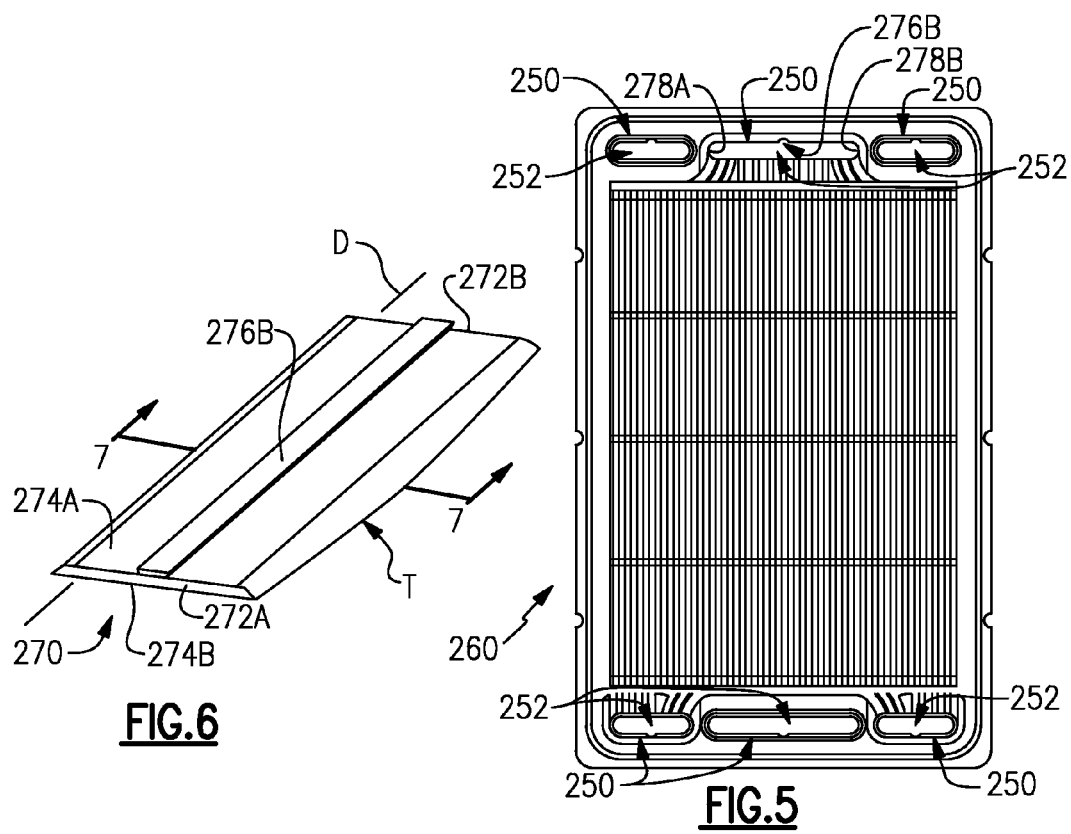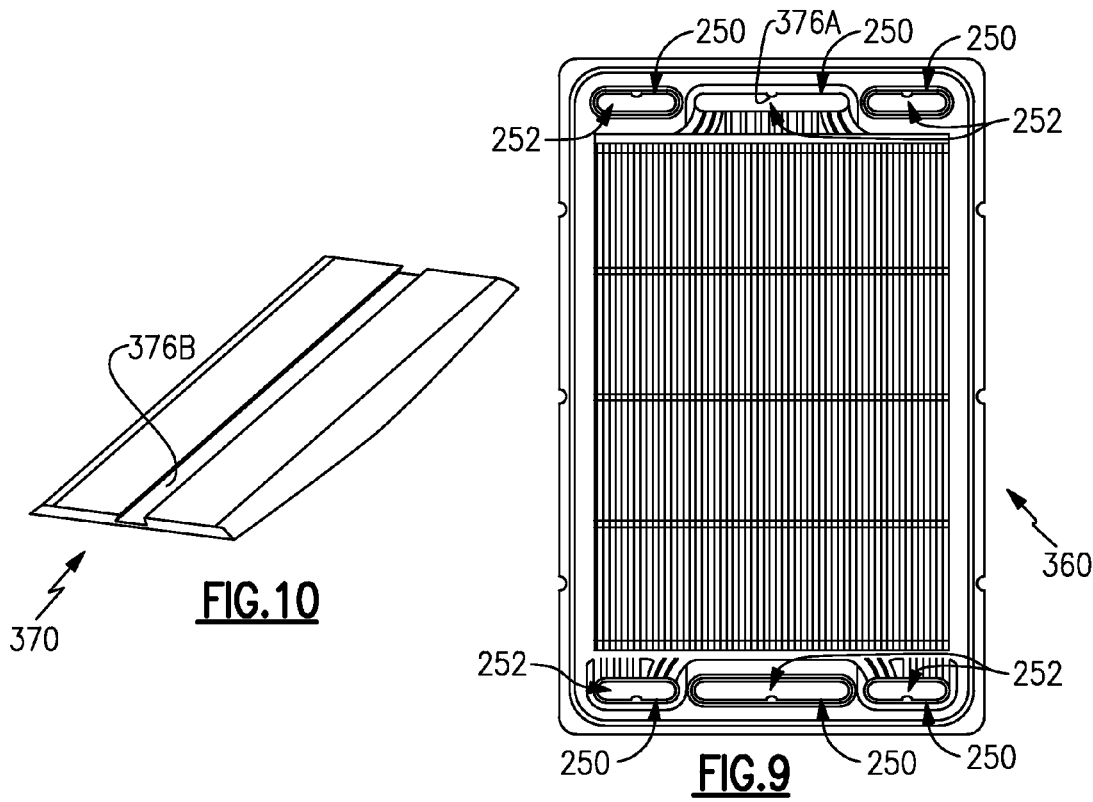

FLOW BATTERY WITH MANIFOLD PASSAGE THAT VARIES IN CROSS-SECTION

BACKGROUND

Flow batteries, also known as redox flow batteries or redox flow cells, are designed to convert electrical energy into chemical energy that can be stored and later released when there is demand. As an example, a flow battery may be used with a renewable energy system, such as a wind-powered system, to store energy that exceeds consumer demand and later release that energy when there is greater demand.

A typical flow battery includes a redox flow cell that has a negative electrode and a positive electrode separated by an electrolyte layer, which may include a separator, such as an ion-exchange membrane. A negative fluid electrolyte (sometimes referred to as the anolyte) is delivered to the negative electrode and a positive fluid electrolyte (sometimes referred to as the catholyte) is delivered to the positive electrode to drive electrochemically reversible redox reactions. Upon charging, the electrical energy supplied causes a chemical reduction reaction in one electrolyte and an oxidation reaction in the other electrolyte. The separator prevents the electrolytes from freely and rapidly mixing but permits selected ions to pass through to complete the redox reactions. Upon discharge, the chemical energy contained in the liquid electrolytes is released in the reverse reactions and electrical energy can be drawn from the electrodes. Flow batteries are distinguished from other electrochemical devices by, inter alia, the use of externally-supplied, fluid electrolyte solutions that include reactants that participate in reversible electrochemical reactions.

SUMMARY

Disclosed is a flow battery that includes a cell stack that has electrochemically active cells and manifolds that define common manifold passages in fluid communication with the electrochemically active cells. A supply/storage system is external of the cell stack and supplies electrochemically active species to the positive and negative electrodes of the cells through respective fluidly connected common manifold passages At least one of the fluid electrolytes contains electrochemically active species that are dissociated into ions and dissolved in a solvent and stored in a storage vessel external to the cell stack. At least one of the fluid electrolytes is ionically-conductive. The manifolds extend in a length direction through the cell stack. The common manifold passages include a common manifold passage P that varies in cross-section along the length direction.

Also disclosed is a method of controlling shunt currents in a flow battery. The method includes using a relatively narrow cross-section portion of the common manifold passage P containing the ionically conducting fluid electrolyte to increase resistance to ion conduction to cells located far away from the manifold inlet. The narrow portion of the common manifold P is located away from where fluid enters or exits the cell stack. Because flow through the common inlet manifold decreases with increasing distance from the fluid inlet to the cell stack, and flow through the common exit manifold decreases with increasing distance from the fluid exit to the stack, this arrangement minimizes the increase in pressure drop caused by the narrow regions.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 5 illustrates an isolated view of a bipolar plate of the cell stack of FIG. 4.

FIG. 6 illustrates a perspective, isolated view of an insert for use in the cell stack of FIG. 4.

FIG. 9 illustrates another example of a bipolar plate.

FIG. 10 illustrates an isolated, perspective view of another example insert.

DETAILED DESCRIPTION

Figure 1:
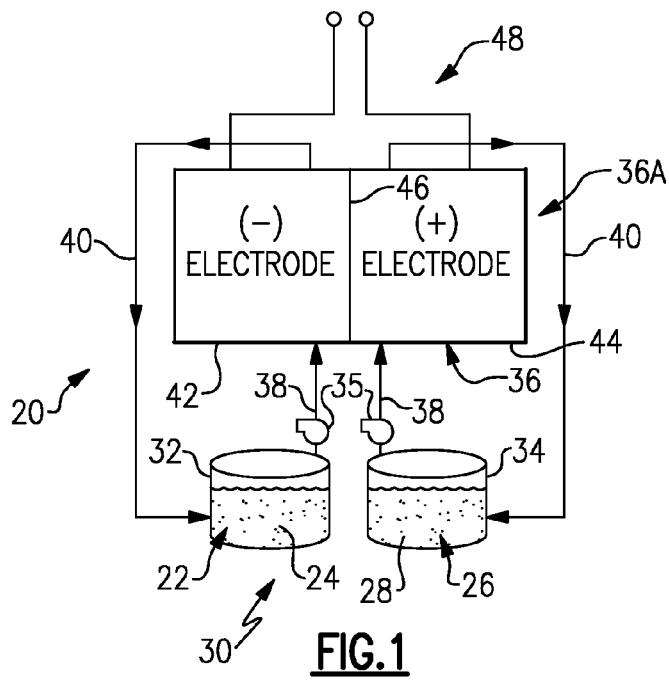
FIG. 1 illustrates an example flow battery.

FIG. 1 schematically shows portions of an example flow battery 20 for selectively storing and discharging electrical energy. As an example, the flow battery 20 can be used to convert electrical energy generated in a renewable energy system to chemical energy that is stored until a later time when there is greater demand, at which time the flow battery 20 then converts the chemical energy back into electrical energy. The flow battery 20 can supply the electric energy to an electric grid, for example.

The flow battery 20 includes at least one fluid electrolyte 22 (i.e., a first ionic-conductive fluid) that has an electrochemically active specie 24 that undergoes reversible redox reactions. The fluid electrolyte 22 may function in a redox pair with regard to an additional fluid electrolyte 26 (i.e., a second ionic-conductive fluid) that has an electrochemically active specie 28, or it may be coupled with an electrochemically active species, such as oxygen (e.g., air) that is not ionically conductive. The electrochemically active species 24/28 include ions of elements that have multiple, reversible oxidation states in a selected liquid solution, such as but not limited to aqueous sulfuric acid. In some examples, the multiple oxidation states are non-zero oxidation states, such as for transition metals including but not limited to vanadium, iron, manganese, chromium, zinc, molybdenum and combinations thereof, and other elements including but not limited to sulfur, cerium, lead, tin, titanium, germanium and combinations thereof. In some examples, the multiple oxidation states can include the zero oxidation state as long as the element is readily soluble in the selected liquid solution in the zero oxidation state. Such elements can include the halogens, such as bromine and chlorine, and combinations thereof. The first fluid electrolyte 22 (e.g., the negative electrolyte) and the second fluid electrolyte 26 (e.g., the positive electrolyte) are contained in a supply/storage system 30 that includes first and second vessels 32/34 and pumps 35. If oxygen or other non-ionically conductive electrochemically active specie is used, the vessel 34 may not be needed. Furthermore, although the examples herein may be described as using, or implied as using, two ionic-conductive fluid electrolytes 22/26, it is to be understood that the examples are also applicable, mutatis mutandis, to the use of one ionic-conductive fluid electrolyte 22 and a non-ionically conductive fluid electrolyte.

The fluid electrolytes 22/26 are delivered from the first and second vessels 32/34, using the pumps 35, to a cell stack 36A of electrochemically active cells 36 (one representative cell shown) of the flow battery 20 through respective feed lines 38. The fluid electrolytes 22/26 are returned from the cell stack 36A to the vessels 32/34 via return lines 40. The feed lines 38 and the return lines 40 connect the vessels 32/34 with the electrochemically active cells 36 of the cell stack 36A.

The electrochemically active cells 36 each include a first electrode 42, a second electrode 44 spaced apart from the first electrode 42, and an electrolyte separator layer 46 arranged between the first electrode 42 and the second electrode 44. For example, the electrodes 42/44 are porous carbon structures, such as carbon paper or felt. The electrochemically active cells 36 can also include bipolar plates, manifolds and the like for delivering the fluid electrolytes 22/26 to the electrodes 42/44. It is to be understood, however, that other configurations can be used. For example, the electrochemically active cells 36 can alternatively be configured for flow-through operation where the fluid electrolytes 22/26 are pumped directly into the electrodes 42/44 without the use of flow field channels.

The electrolyte separator layer 46 can be an ionic-exchange membrane, an inert micro-porous polymer membrane or an electrically insulating microporous matrix of a material, such as silicon carbide (SiC), that prevents the fluid electrolytes 22/26 from freely and rapidly mixing but permits selected ions to pass through to complete the redox reactions while electrically isolating the electrodes 42/44. In this regard, the fluid electrolytes 22/26 are generally isolated from each other during normal operation, such as in charge, discharge and shutdown states.

The fluid electrolytes 22/26 are delivered to the electrochemically active cells 36 to either convert electrical energy into chemical energy or, in the reverse reaction, convert chemical energy into electrical energy that can be discharged. The electrical energy is transmitted to and from the electrochemically active cells 36 through an electric circuit 48 that is electrically coupled with the electrodes 42/44.

Unlike fuel cells that typically utilize gaseous, non-ionically-conductive reactants, flow batteries utilize at least one ionic-conductive fluid reactant, which can be provided as a liquid solution. Because the ionic-conductive fluid reactant is ionically conductive, the ionic-conductive fluid reactant can undesirably act as a "liquid ionic wire" and conduct leakage currents between locations in a flow battery stack or system that differ in voltage potential. Such leakage currents are also known as shunt currents, which debit energy efficiency of a flow battery. Such shunt currents do not typically exist in fuel cells, because gaseous reactants are not ionically conductive. Thus, the phrase "shunt current" as used herein refers to leakage current conducted through an ionic-conductive fluid. As will be described below, the flow battery 20 includes features for reducing shunt current and, thus, improving energy efficiency.

Figure 2:
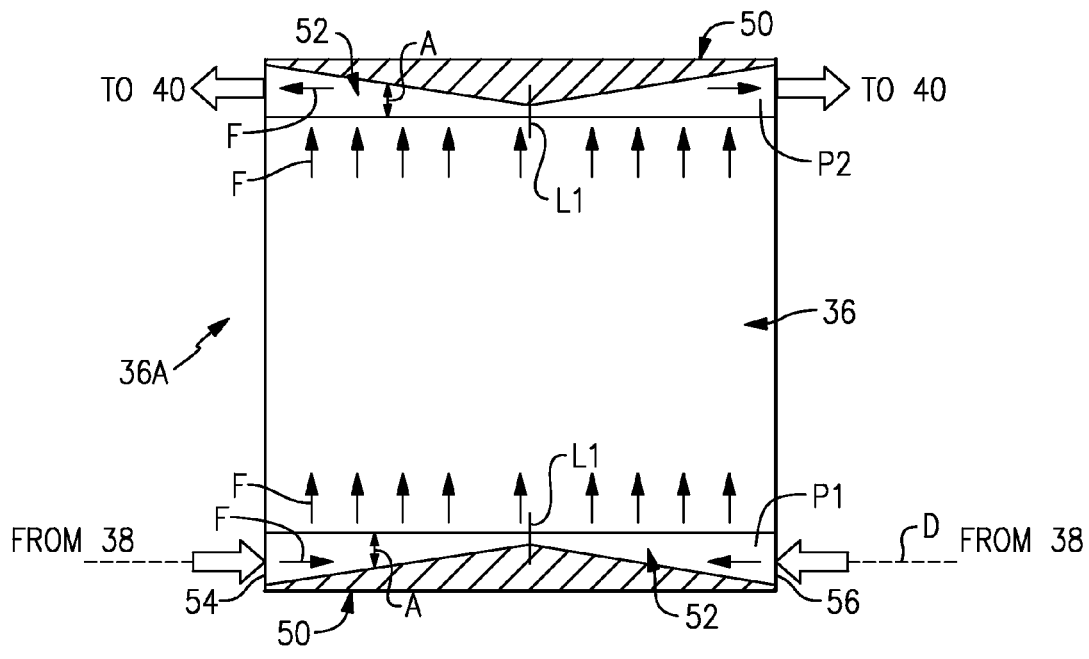
FIG. 2 illustrates and isolated view of a cell stack.

FIG. 2 shows a schematic, isolated view of the cell stack 36A. The cell stack 36A includes the electrochemically active cells 36 (shown schematically) and manifolds 50 that serve to circulate the fluid electrolytes 22/26 to and from the electrochemically active cells 36. In this example, the bottom manifold 50 in FIG. 2 supplies fluid electrolyte to the cells 36 and the top manifold 50 returns the fluid electrolyte to the return line 40. Each of the manifolds 50 defines a common manifold passage 52. The manifolds 50 are thus the physical structure that surrounds and defines the common manifold passages 52. In FIG. 2, the supply common manifold passage 52 (bottom) is designated as common manifold passage P1 and the return common manifold passage 52 (top) is designated as common manifold passage P2.

The manifolds 50 extend continuously between a first end or side 54 of the cell stack 36A and a second end or side 56 of the cell stack 36A. In this example, the manifolds 50 open at each of the sides 54/56, to provide inlet and outlet ports into and out of the cell stack 36A.

The common manifold passages P1/P2 vary in cross-section (area), represented as A, along a length direction, D, of the common manifold passages P1/P2. In this example, the length direction is the elongated direction of the common manifold passages P1/P2, which is also the primary flow direction through the common manifold passages P1/P2.

In this example, each of the common manifold passages P1/P2 has a minimum cross-section at locations L1 that is intermediate of the sides 54/56 of the cell stack 36A. The common manifold passages P1/P2 each taper from the respective sides 54/56 to the minimum cross-sections at locations L1. Thus, each of the common manifold passages P1/P2 has a maximum cross-section at the sides 54/56. The minimum cross-sections at locations L1 can, in one example, be zero such that two different "sub-stacks" are created in a single stack.

As designated by flow arrows, F, the fluid electrolyte 22 or 26 enters into the common manifold passages P1 of the delivery manifold 50 at each of the sides 54/56 of the cells stack 36A. The fluid electrolyte 22 or 26 flows along the common manifold passage P1 and into the electrochemically active cells 36. The fluid electrolyte 22 or 26 exits the cells 36 into the common manifold passage P2 of the return manifold 50 and flows along the length direction out of the cell stack 36A at either side 54 or side 56.

The variation in the cross-section of the common manifold passages P1/P2 serves to reduce shunt currents in the flow battery 20. In one example, the cross-section tapers such that a reduction in the cross-section down the common manifold passages P1/P2 corresponds to the decreasing flow rate required to supply cells far from the inlets to the cell stack. This reduces the increase in pressure drop in the common manifold passages P1/P2 due to the reduction in total passage area. Particular cells 36 of the cell stack 36A can have relatively high shunt currents compared to one or more other cells 36. The shunt currents in the cells 36 can be determined using known techniques. If the cross-section at location L1 is zero, then two U-shape flow passages are created, which essentially feed two different sub-stacks.

The variation in the cross-section A of the common manifold passages P1/P2 reduces the shunt currents in the manifold passages, regardless of the locations of those identified cells 36 that have higher shunt currents. The relatively narrow portions of the common manifold passages P1/P2 at locations L1 provide thinner "liquid ionic wires" that increase the resistance in the manifold passage and thus lower shunt currents in the passage. The relatively narrow portions of the common manifold passages P1/P2 at locations L1 also restricts flow past the middle ones of the cells 36 relative to the outer cells; however, since the flow rate required in the manifold passage regions outside the middle ones of the cells 36 is less than the flow rate required in the manifold passage at the outer cells (which must feed all of the cells downstream), the flow restriction has only a limited effect on the collective pressure drop through all of the cells 36.

Figure 3:
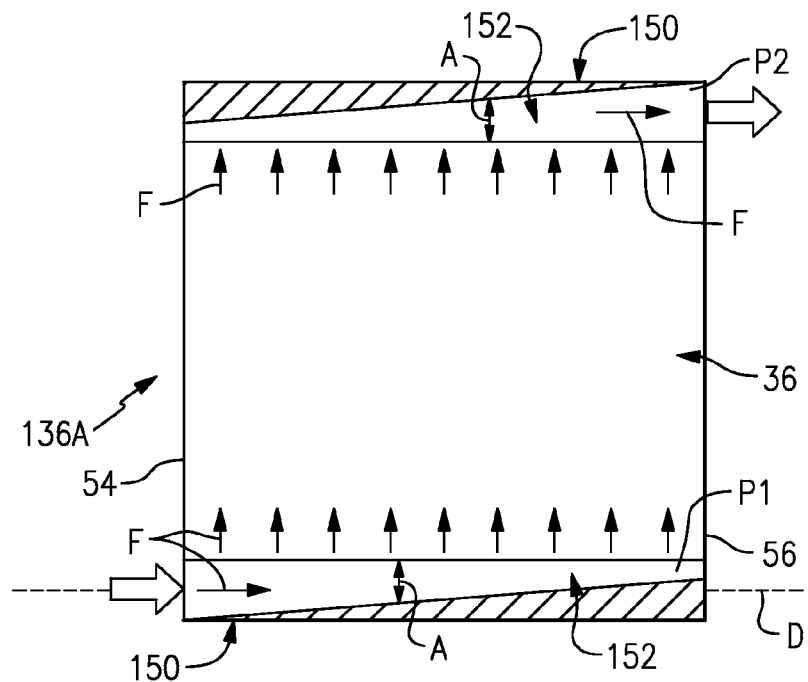
FIG. 3 illustrates an isolated view of another example cell stack.

FIG. 3 illustrates another example cell stack 136A. In this disclosure, like reference numerals designate like elements where appropriate and reference numbers with the addition of one-hundred or multiples thereof designate modified elements that are understood to incorporate the same features and benefits of the corresponding elements unless otherwise noted. In this example, the cell stack 136A includes manifolds 150 that define common manifold passages 152, designated P1/P2 as described above. The common manifold passages P1/P2 vary in cross-section, A, along the length direction, D, of the common manifold passages P1/P2. Whereas the common manifold passages P1/P2 in FIG. 2 have minimum cross-sections at locations L1 intermediate of the sides 54/56 of the cell stack 36A, the common manifold passages P1/P2 in this example have minimum cross-sections at side 56 of the cell stack 136A, which is the downstream portion of the common manifold passages P1/P2 and thereby has the lowest flow rates, and maximum cross-sections at side 54 of the cell stack 136A, which is the upstream portion of the common manifold passages P1/P2 where the flow rate required is equivalent to the flow required to feed all of the cells downstream of this location. The flow through the cell stack 136A thus follows a generally Z-shaped configuration where the fluid electrolyte enters into the cell stack 136A at side 54 into the delivery manifold 150 (bottom), flows through the cells 36 into the return manifold 150 (top) and exits through the side 56 of the cell stack 136A. Generally, the Z-shaped flow configuration provides better cell-to-cell flow uniformity than the U-shaped flow configuration of the arrangement of FIG. 2.

Figure 4:
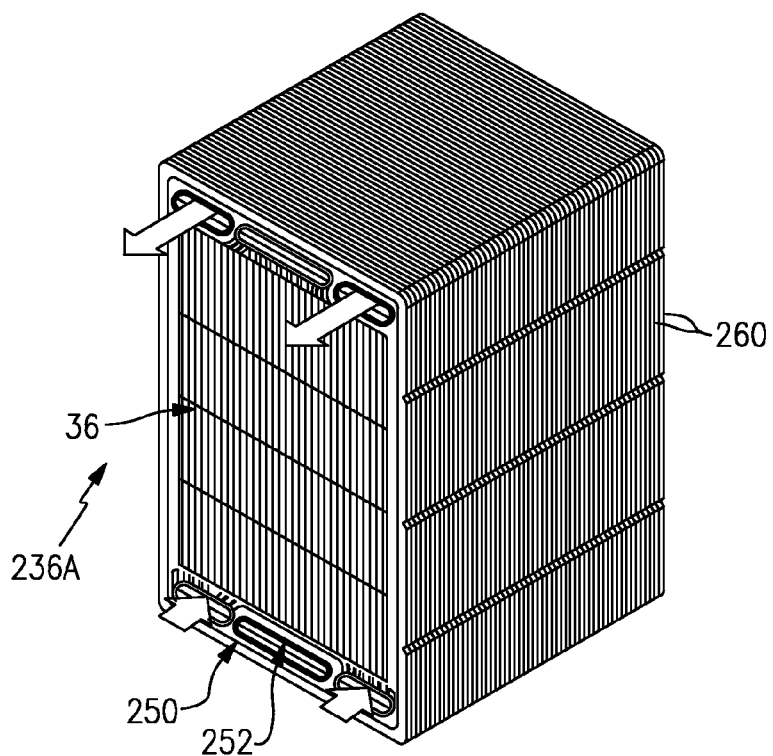
FIG. 4 illustrates a perspective view of another example cell stack.

FIG. 4 illustrates another example cell stack 236A that includes a plurality of bipolar plates 260 interleaved with the cells 36. Although not shown in prior figures, the cell stacks 36A/136A can include similar bipolar plates. FIG. 5 shows an isolated view of a representative one of the bipolar plates 260. As shown, the bipolar plate 260 includes various ports at the top and the bottom such that, when stacked together with like bipolar plates 260, the ports align to form the manifolds 250 and common manifold passages 252. In this example, each of the bipolar plates 260 is identical in geometry. For example, the use of identical geometry bipolar plates 260 facilitates a reduction in fabrication costs. The bipolar plate depicted in FIG. 5 has six common manifold passages 252, three for each of the reactants. However, plate designs with only four manifold passages (an inlet and outlet passage for each reactant) can alternatively be used.

Figure 7:
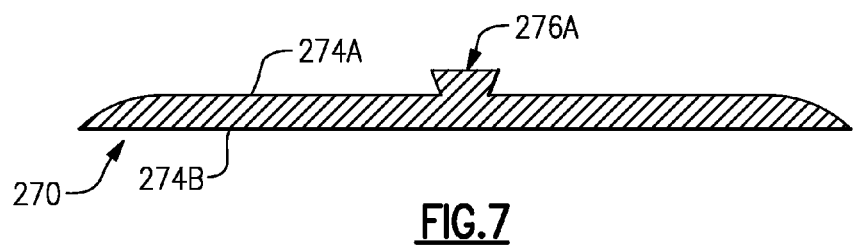
FIG. 7 illustrates a cross-sectional view according to the section shown in FIG. 6.

FIG. 6 illustrates an isolated view of an insert 270, which is provided in one or more of the common manifold passages 252 to vary the cross-section in a similar geometry as shown in FIG. 2. FIG. 7 shows a sectioned view of the insert 270 along the section line shown in FIG. 6. The insert 270 extends between a first end 272A and a second 272B and a first side 274A and a second side 274B. Once installed into one of the common manifold passage 252, the first side 274A is oriented adjacent one of the walls of the manifold 250 and the second side 274B faces into the common manifold passage 252. The second side 274B tapers, as indicated at T, along the length direction D to provide the variation in cross-section of common manifold passage 252. Location L1 is indicated on the insert 270, which is the thickest portion of the insert 270 and thus provides the narrowest potion of the common manifold passage 252.

In this example, the insert 270 and the manifold 250 include attachment features 276A/276B that serve to mount the insert 270 in the common manifold passage 252. As shown, 276A is a rail that extends along the length of the insert 270 and 276B is a slot (FIG. 5). Each manifold 250 that will receive an insert 270 has a slot 276B.

Figure 8:
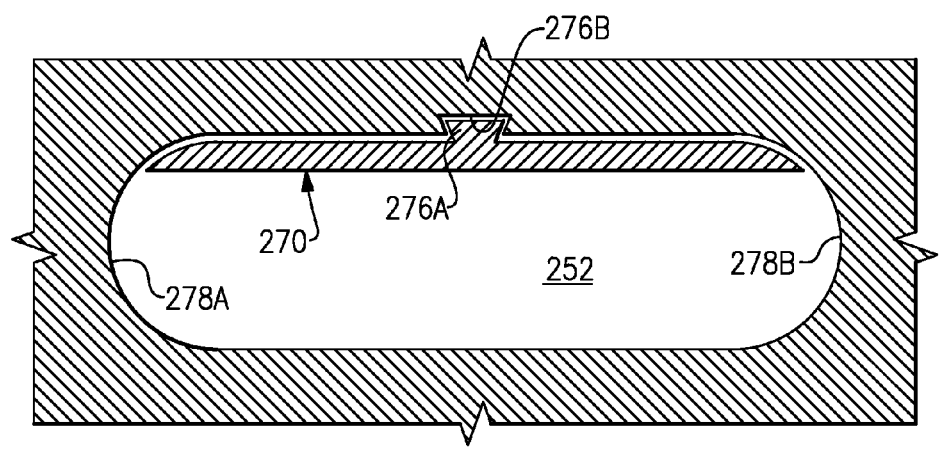
FIG. 8 illustrates a view of an insert installed in a common manifold passage.

The insert 270 is slidably received into the common manifold passage 252 such that the rail 276A is received into the slot 276B, as shown in sectional view of FIG. 8. The insert 270 can be slightly shorter in length than the length of the common manifold passage 252 in order to accommodate manufacturing tolerances and ensure that the insert 270 does not breach the sides of the cell stack 236A.

The rail 276A and the slot 276B have a wedge-like geometry such that the rail 276A interlocks with the slot 276B to retain the insert 270 in the common manifold passage 252. That is, the rail 276A is larger at its free end. Other geometries of interlocking features can alternatively be used and the examples are not limited to the geometry shown. The insert 270 can be further bonded with an adhesive or the like, although adhesive is not necessary for retention of the insert 270 and is not needed for sealing because the manifolds 250 are sealed. Additionally, the insert 270 can facilitate alignment of the bipolar plates 260 during stacking because the rail 276A extends through the segments of the slot 276B on each bipolar plate 260 in the stack.

As indicated, the use of identical geometry bipolar plates 260 can reduce costs. However, an alternative to using the insert 270 would be to provide bipolar plates with ports that vary in geometry such that, once assembled together, the geometry variations of the ports provide the variation in the common manifold passages. The fabrication of individualized geometry bipolar plates, however, may increase costs.

In another example, the rail 276A and the slot 276B can both be laterally offset from the position shown in FIG. 8 toward one or the other of the sides 278A or 278B of the common manifold passage 252, as indicated by the arrows to the left and right of the rail 276A and slot 276B, to provide a mistake-proof feature such that the insert 270 fully seats into the common manifold passage 252 only in a proper orientation. In other words, the offset of the rail 276A and the slot 276B prevents the insert from being installed into the common manifold passage 252 in any other orientation that will not fully seat. Alternatively, as shown in FIGS. 9 and 10, the slot 376B can be on the insert 370 and the rail 376A can be in the manifold 250 of bipolar plate 360.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A flow battery comprising:
    a cell stack including electrochemically active cells and manifolds defining common manifold passages in fluid communication with the electrochemically active cells;
    a supply/storage system external of the cell stack, the supply/storage system including at least one vessel fluidly connected with respective common manifold passages; and fluid electrolytes in the supply/storage system, at least one of the fluid electrolytes being an ionically-conductive fluid, the manifolds extending in a length direction through the cell stack, and the common manifold passages including a common manifold passage P varying in cross-section along the length direction, and the common manifold passage P includes a removable insert that defines the varying cross-section.

2. A flow battery comprising:
a cell stack including electrochemically active cells and manifolds defining common manifold passages in fluid communication with the electrochemically active cells;
a supply/storage system external of the cell stack, the supply/storage system including at least one vessel fluidly connected with respective common manifold passages; and
fluid electrolytes in the supply/storage system, at least one of the fluid electrolytes being an ionically-conductive fluid,
the manifolds extending in a length direction through the cell stack, and the common manifold passages including a common manifold passage P varying in cross-section along the length direction, wherein the common manifold passage P has a minimum cross-section intermediate of ends of the cell stack, and the minimum cross-section is zero such that first and second sub-stacks are created in the cell stack.

3. A flow battery comprising:
a cell stack including electrochemically active cells and manifolds defining common manifold passages in fluid communication with the electrochemically active cells;
a supply/storage system external of the cell stack, the supply/storage system including at least one vessel fluidly connected with respective common manifold passages; and
fluid electrolytes in the supply/storage system, at least one of the fluid electrolytes being an ionically-conductive fluid,
the manifolds extending in a length direction through the cell stack, and the common manifold passages including a common manifold passage P varying in cross-section along the length direction, wherein the manifold corresponding to the common manifold passage P includes an insert that defines the varying cross-section, the insert slidably engaged with the manifold, wherein the insert and the manifold include a mistake-proof feature with respect to the insert fully seating into the manifold, wherein the mistake-proof feature includes a rail on one of the manifold or the insert and a slot on the other of the manifold or the insert, the rail slidingly interlocking with the slot, wherein the rail and the slot each have a wedge-like geometry such that the rail interacts with the slot to retain the insert in the common manifold passage.

4. The flow battery as recited in claim 2, wherein the at least one vessel includes first and second vessels and the fluid electrolytes include two ionic-conductive fluids.

5. The flow battery as recited in claim 2, wherein the common manifold passage P has a minimum cross-section intermediate of ends of the cell stack.

6. The flow battery as recited in claim 2, wherein the common manifold passage P has a minimum cross-section at an end of the cell stack.

7. The flow battery as recited in claim 2, wherein the common manifold passage P has opposed open ends, and the cross-section of the common manifold passage P tapers from each of the opposed open ends.

8. The flow battery as recited in claim 2, wherein the common manifold passage P has opposed open ends, and the cross-section of the common manifold passage P tapers from one of the opposed ends to the other of the opposed ends.

9. The flow battery as recited in claim 1, wherein the insert is slidably engaged with the manifold.

10. The flow battery as recited in claim 3, wherein the insert is non-conductive.

11. The flow battery as recited in claim 3, wherein the insert is polymeric.

12. The flow battery as recited in claim 9, wherein the insert and the manifold include a mistake-proof feature with respect to the insert fully seating into the manifold.

13. The flow battery as recited in claim 12, wherein the mistake-proof feature includes a rail on one of the manifold or the insert and a slot on the other of the manifold or the insert, the rail slidingly interlocking with the slot.

14. The flow battery as recited in claim 3, wherein the rail and the slot are intermediate of, and offset between, opposed sides of the manifold.

15. The flow battery as recited in claim 3, wherein the insert aligns the electrochemically active cells.

16. The flow battery as recited in claim 2, wherein the ionic-conductive fluids include ions of an element selected from a group consisting of vanadium, iron, manganese, chromium, zinc, molybdenum, sulfur, cerium, lead, tin, titanium, germanium, bromine, chlorine and combinations thereof.

17. The flow battery as recited in claim 2, wherein the common manifold passage P has a relatively narrow cross-section portion arranged to restrict flow of one of the ionic-conductive fluids with respect to one or more of the electrochemically active cells that have the relatively higher shunt current than at least one other one of the electrochemically active cells.

18. The flow battery as recited in claim 5, wherein the minimum cross-section is zero such that first and second sub-stacks are created in the cell stack.

19. The flow battery as recited in claim 2, further comprising a plurality of bipolar plates interleaved with the electrochemically active cells in the cell stack, wherein the plurality of bipolar plates each include one or more ports, the ports configured to align to form the manifolds and common manifold passages.

20. The flow battery as recited in claim 13, wherein the rail and the slot each have a wedge-like geometry such that the rail interacts with the slot to retain the insert in the common manifold passage.

21. The flow battery as recited in claim 3, further comprising a plurality of bipolar plates interleaved with the electrochemically active cells in the cell stack, and wherein the insert is configured to facilitate alignment of the bipolar plates.

* * * * *